United States Patent [19]

Lederman

[11] Patent Number: 4,822,183
[45] Date of Patent: Apr. 18, 1989

[54] THRUST BALL BEARING WITH IMPROVED SEALING

[75] Inventor: Frederick E. Lederman, Sandusky, Ohio

[73] Assignee: General Motors Corporation, Detroit, Mich.

[21] Appl. No.: 240,183

[22] Filed: Sep. 6, 1988

[51] Int. Cl.⁴ .................. F16C 33/38; F16C 33/78
[52] U.S. Cl. ........................ 384/607; 384/477;
384/484; 384/523; 384/614; 277/DIG. 10
[58] Field of Search ............ 384/607, 614, 615, 523,
384/484, 477, 621, 623; 277/DIG. 10

[56] References Cited

U.S. PATENT DOCUMENTS 3,414,341  4/1966  Murphy .
3,554,621  1/1971  McAllister ................... 384/484
3,810,639  5/1974  Scannell ................. 277/DIG. 10
3,811,744  5/1974  Wren et al. .
3,847,456  11/1974 Schwarzbich .
4,497,523  2/1985  Lederman ..................... 384/613
4,541,744  9/1985  Lederman ..................... 384/607
4,602,875  7/1986  Deerr et al. .................... 384/547
4,708,497  11/1987 Lederman ..................... 384/448
4,783,182  11/1988 Caron et al. ................... 384/523

Primary Examiner—Lenard A. Footland
Attorney, Agent, or Firm—Patrick M. Griffin

[57] ABSTRACT

A unitary molded plastic ball cage for a thrust bearing with axially opposed races has seals molded to the cage separator that break away at assembly for independent sealing operation.

3 Claims, 2 Drawing Sheets

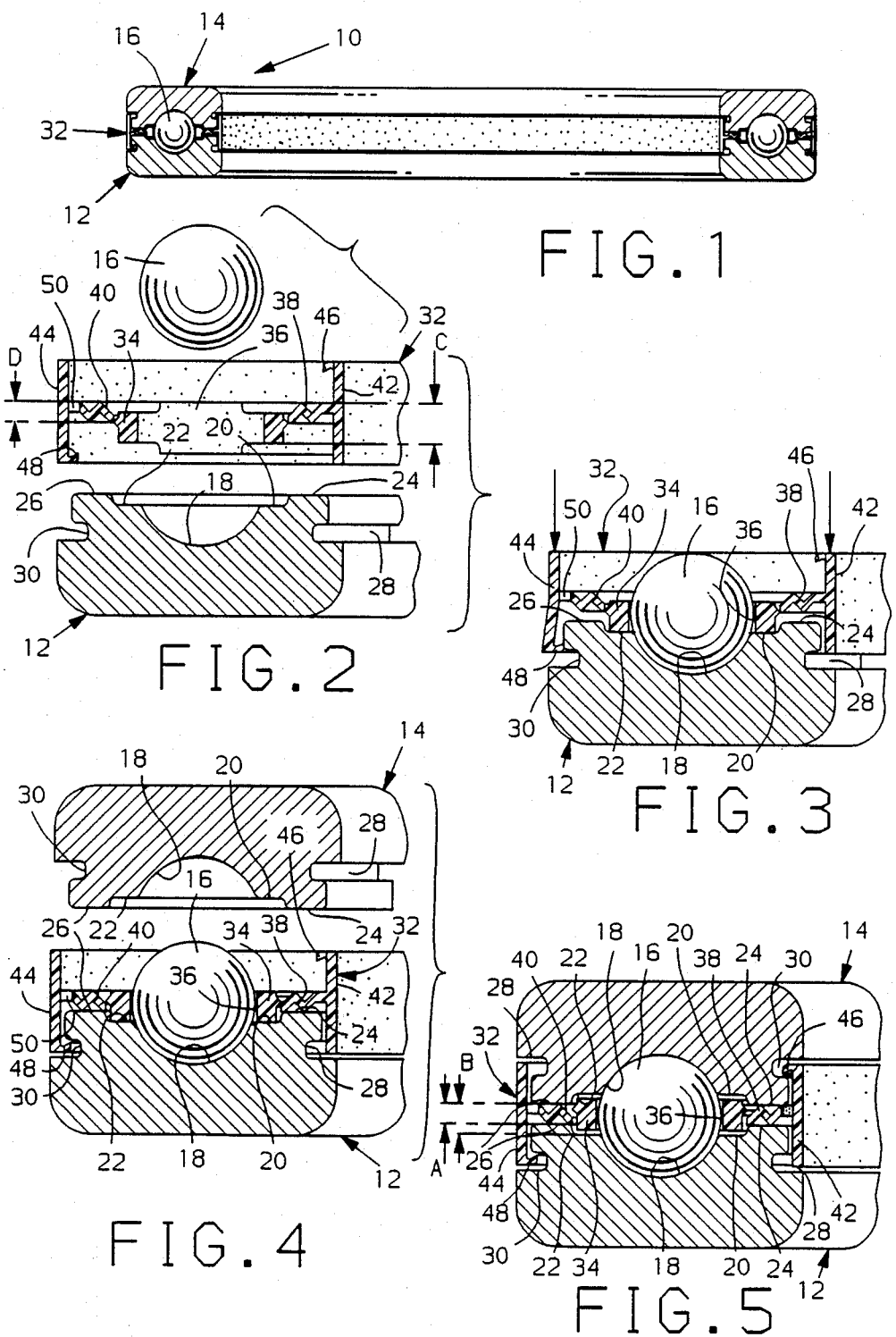

THRUST BALL BEARING WITH IMPROVED SEALING

This invention relates to rolling element thrust bearings of the type that are used in the steerable front suspension struts of automobiles.

BACKGROUND OF THE INVENTION

Rolling element thrust bearings have a pair of generally identical races that are assembled by pushing them axially together to capture a complement of bearing elements between the inner surfaces of the races. The race inner surfaces may be flat, but more often each has a trough like pathway that receives the bearing elements. Before installation, a retention structure may prevent the races for separating. After installation, of course, the retention structure is redundant, as the thrust forces push the races together, and the bearing elements keep the races spaced axially apart. It is desirable that the inboard and outboard sides of the bearing elements be sealed, both to retain lubricant and exclude contaminants.

A number of different structures have been proposed for sealing such bearings. Often, a pair of sealing lands is provided on each race, one inboard and one outboard of the pathway, which are maintained in axially spaced relation by the bearing elements. The lands may be a flat annular surfaces, or just that part of the race inner surface that borders the pathway. A seal is captured between each pair of opposed sealing lands to seal the bearing elements. A typical example of such seals is a pair of separate rings, as may be seen at 90 and 92 in FIG. 2 of U.S. Pat. No. 4,497,523 to Lederman, assigned to the assignee of the subject invention. Another example of a pair of separate seals may be seen at 48 and 46 in FIG. 1 of U.S. Pat. No. 4,708,497 to Lederman, also assigned to the assignee of the current invention, in which the seals also act to hold the races together.

While separate seals provide complete, rigorous sealing, they must be separately manufactured and assembled, which is costly in terms of numbers of parts and handling. One means of eliminating separate seals may be seen in U.S. Pat. No. 4,541,744 to Lederman, also assigned to the assignee of the invention, where a one piece molded cage prevents the races from pulling apart and also provides a non rubbing, labyrinth seal. This is useful in environments where absolutely rigorous sealing isn't necessary. An example of a design approach that eliminates separate seals, but still attempts to provide the rigorous sealing that separate seals would, may be seen in U.S. Pat. No. 3,414,341 to Murphy. There, seal lips are integrally molded to the cage so as to rub on the inner surface of each race. An inherent drawback of integrating the seal lips with the cage is that they are then forced to rotate with, and about the axis of, the rolling elements. Separate seals have the ability to follow their own path of least resistance between the seal lands, floating axially and raidally between the lands within limits, or sticking intermittently to one land and rubbing on the other. Being able to move independently, separate seals ahve the ability to seal most efficiently, finding an equilibrium, which seals that are tied to the cage cannot. A practical drawback of an integral cage-seal unit is that cages are molded from hard plastics, which are not particularly good at conforming to race surfaces. Murphy cantilevers the sealing lips to the cage to create some flexibility, but this also creates an undercut relative to the cage axis that would make it difficult to mold with a single pair of axially parting molds, known as by pass molding.

SUMMARY OF THE INVENTION

The invention discloses a cage for use with a thrust bearing of the type described above that provides both the handling and cost advantage of integrally molded seals, and the sealing efficiency of separate seals.

The bearing with which the invention is used includes a pair of annular races, each with a trough like ball pathway that is bordered by a pair of annular sealing lands. The preferred embodiment of the invention is an integrally molded plastic cage and seal unit that includes an annular separator with a pocket array, and a pair of seals frangibly molded to the separator. The seals border the pocket array, and each has a thickness substantially equal to the fixed spacing between the seal lands. The as molded location of each seal relative to the separator, prior to the races being assembled, is offset from the location of the respective seal lands relative to the separator after the races have been assembled.

When the ball complement is placed in the pathway of one race and the pocket array is fitted over the ball complement, the separator will contact the one race to hold the seals away from the respective seal lands. Therefore, if a force is applied to push the seals farther toward the seal lands of the one race, they will break away from the separator. Thereafter, the other race may be assembled, which will capture the now separated seals between the seal lands. The preferred embodiment has additional features and advantages. Cylindrical flanges molded integrally to the outboard edges of the seal protect the seals prior to assembly, provide a convenient means for applying a breaking force to the seals during assembly, and also have tabs that snap fit to the races to prevent pre installation race separation. The seals are especially configured to be flexible and conform well to the seal lands, but the entire cage-seal-flange unit may be by pass molded.

It is, therefore, a general object of the invention to provide a cage for a rolling element thrust bearing that has the convenience of integral seals, but the sealing effectiveness of separate seals.

It is another object of the invention to achieve those advantages by first frangibly molding a pair of seals to the cage separator so as to have a one piece unit before the races are assembled, and later breaking the seals away from the separator, so that the seals may operate independently thereafter.

It is another object of the invention to provide a cage-seal unit in which, prior to race assembly, the seals are frangibly molded to the cage separator at a location offset from the post assembly location of the seal lands relative to the separator, so that the seals will be held away from the seal lands of one of the races by the separator and may be easily broken away just before, or during, assembly of the other race.

It is still another object of the invention to provide such a cage-seal unit in which the seals are especially designated to conform well to the seal lands, but may be by pass molded along with the cage.

DESCRIPTION OF THE PREFERRED EMBODIMENT

These and other objects and features of the invention will appear from the following written description, and from the drawings, in which:

FIG. 1 is a cross sectional view of an assembled thrust ball bearing incorporating a preferred embodiment of the invention;

FIG. 2 is an exploded cross sectional view of one side of the lower bearing race, showing one bearing ball and a preferred embodiment of the invention prior to assembly;

FIG. 3 is a view like FIG. 2, but showing the ball in the pathway of the lower race and the cage-seal unit of the invention in the process of being assembled;

FIG. 4 is a view like FIG. 3, but showing the cage-seal unit assembled to the lower race, and the upper race moving down toward its assembled position;

FIG. 5 is a view like FIG. 4, but showing the bearing completely assembled;

Figure 6:
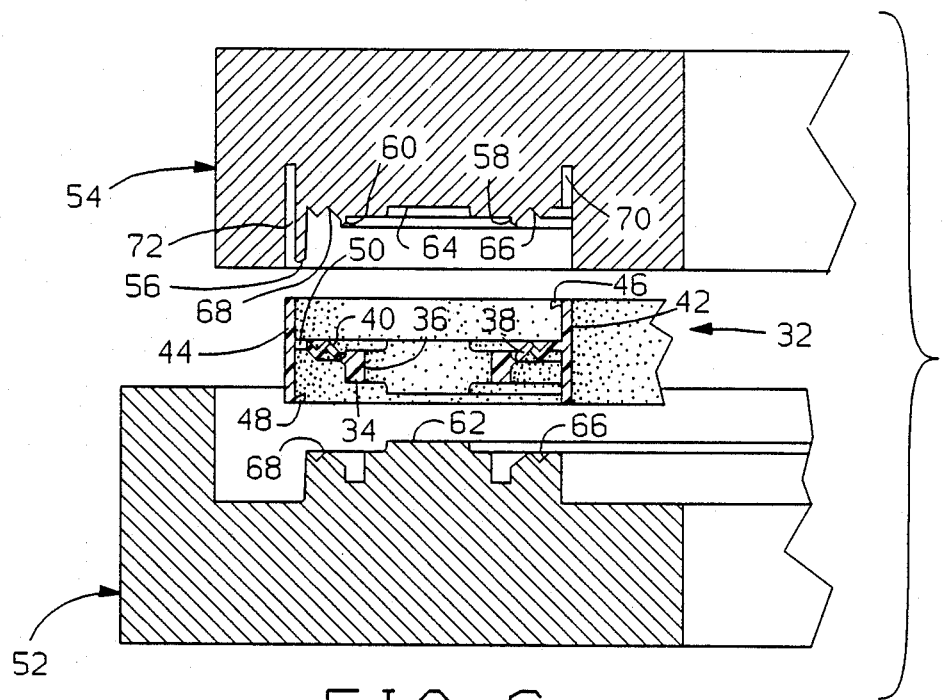
FIG. 6 is a cross sectional view showing one side of the cage-seal unit of the invention and the molds that form it.

Referring first to FIGS. 1 and 2, the invention is used with a thrust bearing, indicated generally at 10. Bearing 10 has a lower race 12 and an upper race 14 which capture a complement of bearing balls 16 between them. Each race 12 and 14 is identical, but they are numbered differently to clarify later description of the assembly method. Each race 12 and 14 is annular in shape, and is machined or coined from a suitable steel blank with a trough shaped ball pathway 18 centered about its axis. An annular inboard shelf 20 and an annular outboard shelf 22 directly border each pathway 18. An annular inboard seal land 24 and an annular outboard seal land 26 directly border the shelves 20 and 22, and thereby indirectly border the pathway 18, as well. Inboard and outboard slots 28 and 30 respectively are cut into each race 12 and 14 below the respective seal lands 24 and 26.

Referring next to FIGS. 1 and 5, prior to the installation of bearing 10, it is first assembled by placing the bearing balls 16 in the pathway 18 of one of the races, here the lower race 12, and then moving the upper race 14 coaxially toward the lower race 12 to capture the bearing balls 16 between the confronting pathways 18. Bearing 10 would then be installed in an environment where it was subject to axial thrust loads that continually push the races 12 and 14 together, such as in the steerable front strut of an automobile. Therefore, post installation, the complement of balls 16 would maintain the races 12 and 14 axially spaced apart a fixed distance. Consequently, all confronting surfaces of the races 12 and 14 have a predetermined axial position relative to one another, which can be referred to as their assembled position. The seal lands 24 and 26 on each race 12 and 14 form axially opposed pairs, spaced apart by a fixed distance indicated at A in FIG. 5. The shelves 20 and 22 of lower race 12 are axially spaced from the seal lands 24 and 26 of the upper race 14 by a different fixed distance, indicated at B.

Figure 7:
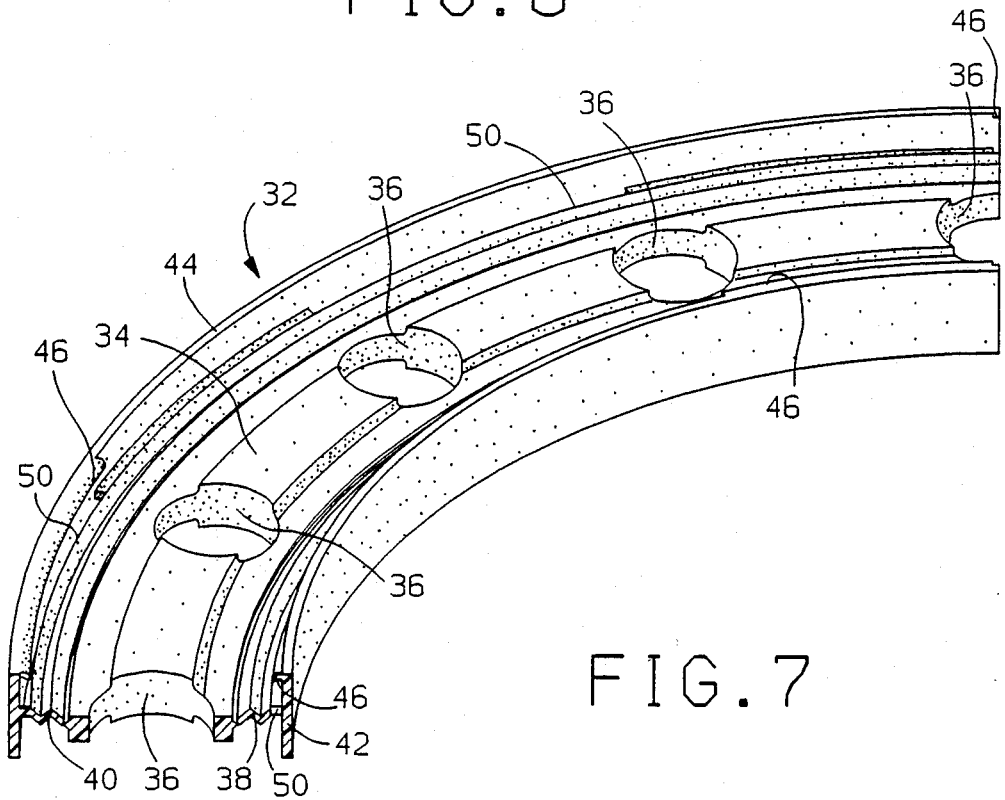
FIG. 7 is a perspective view of a portion of the cage-seal unit of the invention prior to assembly.

Referring next to FIGS. 2 and 7, a preferred embodiment of the cage-seal unit of the invention is designated generally at 32. Unit 32 includes a separator 34 in the shape of an annular disk with an array of ball pockets 36. Annular, integrally molded inboard and outboard seals, 38 and 40 respectively, border the pockets 36 at positions co-radial with the respective seal lands 24 and 26. Each seal 38 and 40 has a double V shaped cross section with a total axial thickness, indicated at D, that is substantially equal to, or just greater than, A. Each seal 38 and 40 also has a pre assembly location relative to the separator 34 that is, in general, offset from the assembled location of the seal lands 24 and 26 relative to the separator 34. More specifically, prior to assembly, the uppermost surface of each seal 38 and 40 is axially spaced a distance C from the undersurface of separator 34, which distance is greater than B. Integrally molded to the outside edge of each seal 38 and 40 is a cylindrical flange, 42 and 44 respectively. Each flange 42 and 44 is also molded with a series of inwardly extending upper and lower tabs 46 and 48, which serve a purpose described below, and which overlay matching windows 50 formed at the juncture of the seals 38 and 40 with their respective flanges 42 and 44. More features of the unit 32 may be described by referring to the method of its molding.

Referring next to FIG. 6, a single pair of axially opposed lower and upper molds, indicated generally at 52 and 54, are closed and a suitable plastic is injected, after which they part, which is generally referred to as by pass molding. In effect, the unit 32 is as easily molded as any conventional, simple cage. This is possible because the outer surfaces of all elements of unit 32 have no undercuts relative to its axis, allowing the molds 52 and 54 to close and part along the same axis. For example, the sides of the ball pockets 36 are straight and parallel to the axis. The V's of the seals 38 and 40 open outwardly, both above and below. The sides of the cylindrical flanges 42 and 44 are also straight and parallel to the axis, except for the tabs 46 and 48, which overlay the windows 50. The confronting inner surfaces of molds 52 and 54 are shaped so as to match the outer surfaces of the various elements of unit 32. For example, the upper mold 54 has axially extending spades 56 that form the windows 50 and the lower tabs 48. Similar structure on the lower mold 52, not shown, would form the upper tabs 46. Inboard and outboard circular knife edges 58 and 60 respectively on upper mold 54 create a thin, frangible web joining the inboard and out board seals 38 and 40 to the separator 34. Plugs 62 on lower mold 52 mate with sockets 64 on upper mold 54 to form the array of pockets 36. Inboard and outboard double V shaped troughs 66 and 68 on each of the molds 52 and 54 mate to form the inboard and outboard seals 38 and 40. Inboard and outboard slots 70 and 72 respectively on upper mold 54 form the inboard and outboard cylindrical flanges 42 and 44. After molding and cooling, the one piece unit 32 may be easily shipped and handled. Before assembly, the flanges 42 and 44 shelter and protect the seals 38 and 40 against axial forces that could break them away prematurely. During and after assembly, the flanges 42 and 44 cooperate to provide other functions as well, as will be described next.

Referring next to FIGS. 2 and 3, once the unit 32 has been molded as described, the next step in the method of manufacturing bearing 10 is assembly. First, the bearing balls 16 are placed in the pathway 18 of the lower race 12 and spaced by the separator 34. This may be done by putting the balls 16 into the pathway 18, evenly spacing them apart, and then fitting the array of pockets 36 over them. Or the pockets 36 may be aligned with the pathway 18 of lower race 12 first, and the complement of balls 16 then dropped into the pockets 36. Since separator 34 is integral to the unit 32, it is installed as the unit 32 is installed. A particularly convenient way of installing the unit 32 is to press down on the flanges 42 and 44, as shown by the arrows. As this is done, the lower tabs 48 will slide past the outboard seal lands 26 of the lower race 12, flexing the flanges 42 and 44 outward slightly, although the flexing of the outboard flange 44 only shows in FIG. 3. Because C is greater than B, as described above, the lower surface of the separator 34 will act as a stop, contacting the shelves 20 and 22 and thereby holding the seals 38 and 40 away from the seal lands 24 and 26 of lower race 12.

Referring next to FIGS. 4 and 5, continued pressing on the flanges 42 and 44 will push the seals 38 and 40 toward the lower race 12, breaking them away from the bottomed out separator 34 at the frangible webs described above. Simultaneously, the lower flange tabs 48 will snap into the slots 28 and 30 of the lower race 12. At this point, the seals 38 and 40 have become independent of the separator 34 and of each other, although they are retained to the lower race 12 by the lower tabs 48. Next, the upper race 14 is pressed coaxially down toward the lower race 12 to the FIG. 5 assembled position. Then, the complement of balls 16 is captured between the confronting pathways 18, and the flange upper tabs 46 are snapped into the upper race slots 28 and 30, preventing the races 12 and 14 from being pulled apart. Also, the seals 38 and 40 are captured between the opposed pairs of seal lands 24 and 26. Because the seals 38 and 40 are broken away from the separator 34, each is free to follow its own path as bearing 10 operates. Consequently, in FIG. 5, the inboard seal 38 is shown to have rotated away from its FIG. 4 position, independently of the separator 34 and the other seal 40. Because of the relation of A and D noted above, it is assured that the seals 38 and 40 will contact both seal lands 24 and 26 of each opposed pair. The double V shape assures that there will be two area of line contact each land 24 and 26. Furthermore, the double V shape of the seals 38 and 40 allows them to be compressed easily between, and conform to the surfaces of, the opposed pairs of seal lands 24 and 26, in spite of the hard plastic from which they are molded. So, sealing is improved due both to the post assembly independence of the seals 38 and 40 and due to their size and shape.

Variations of the preferred embodiment 32 may be made. The flanges 42 and 44 are not necessary for the operation of the seals 38 and 40 in the broadest sense. The seals 38 and 40 could be broken away by some other means, such as pushing on them directly, or just by the action of the upper race 14 being pushed down toward the lower race 12. However, the flanges 42 and 44 provide a great benefit in that they protect the seals 38 and 40 prior to assembly, evenly apply the break-away force during assembly, retain the seals 38 and 40 to the lower race 12 before the upper race 14 is added, and retain the races together prior to installation of the bearing 10, all in a one piece structure that can be by pass molded. A different shape for the seals 38 and 40 could be used, so long as they were sufficiently thick to fill the gaps between the opposed seal lands 24 and 26, but the double V shape is advantageous in that it is both flexible and by pass moldable. Some other surface of the unit 32 could act as a stop to engage lower race 12 and hold the seals 38 and 40 temporarily above the seal lands 24 and 26. However, the undersurface of the separator 34 is very convenient as a stop since it is midway between the seals 38 and 40 and makes good, continuous contact with the shelves 20 and 22. Only an outboard seal 40 would be necessary in a bearing in which the races were not open through the center. Therefore, it will be understood that the invention is not intended to be limited to just the preferred embodiment disclosed.

The embodiments of the invention in which an exclusive property or privilege is claimed are defined as follows:

1. In a bearing of the type in which an array of pockets in a separator is fitted over a complement of bearing elements prior to a pair of generally annular races being moved coaxially together to an assembled position to capture said bearing elements, thereby spacing apart a pair of axialy opposed seal lands on said races by a predetermined distance, the improvement comprising, at least one generally annular seal adjacent said pocket array, said seal having an axial thickness substantially equal to said predetermined distance and being frangibly joined to said separator at a location axialy offset from the assembled position of said seal lands, whereby, after said bearing elements have been placed in one race and said separator has been fitted to said bearing elements, a force may be applied to push said seals toward said one race, thereby breaking said seals away from said separator, after which the other race may be assembled to capture said seals between said lands to seal said bearing elements independently of said separator.

2. A bearing, comprising, a pair of generally annular races, each having a pathway formed about its axis and a pair of seal lands bordering said pathway.

a complement of rolling bearing elements that are captured between said pathways when said races are moved coaxially together to maintain said seal lands spaced axially apart by a predetermined distance, and, a generally annular cage and seal unit comprising a separator having an array of pockets that fit over said bearing elements and a stop portion engageable with one race, said cage and seal unit further comprising a pair of generally annular seals bordering said pocket array, each seal having an axial thickness substantially equal to said predetermined distance and being frangibly joined to said separator prior to said races being moved coaxially together at a location such that each seal is held axially away from a respective seal land on said one race when said separator stop portion is engaged with said one race, whereby, after said separator has been fitted over said bearing elements in the pathway of said one race, a force may be applied to push said seals toward the seal lands on said one race, thereby causing said seals to break away from said separator, so that said seals are captured between said lands to seal said bearing elements independently of said separator.

3. For use in a bearing of the type having a complement of bearing elements and a pair of generally annular bearing races, each race having a pathway formed about its axis in which said bearing elements are receivable and also having pairs of seal lands bordering said pathway which are maintained axially spaced apart a predetermined distance when said races are moved coaxially together to capture said bearing elements between said pathways, an improved cage and seal unit, comprising,
  a generally annular separator having an array of pockets that fit over said bearing elements, said separator also having a stop portion engageable with one race, and,
  a pair of generally annular seals bordering said pocket array, each seal having an axial thickness substantially equal to said predetermined distance and being frangibly joined to said separator prior to said races being moved coaxially together at a location such that each seal is held axially away from a respective seal land on said one race when said separator stop portion is engaged with said one race,
  whereby, after said separator has been fitted over said bearing elements in the pathway of said one race, a force may be applied to push said seals toward the seal lands on said one race, thereby causing said seals to break away from said separator, after which said seals are captured between said lands to seal said bearing elements independently of said separator.

* * * * *